United States Patent
Conner et al.

(10) Patent No.: US 11,522,750 B2
(45) Date of Patent: *Dec. 6, 2022

(54) USING NETWORK CONNECTION HEALTH DATA, TAKEN FROM MULTIPLE SOURCES, TO DETERMINE WHETHER TO SWITCH A NETWORK CONNECTION ON REDUNDANT IP NETWORKS

(71) Applicant: Edgewater Networks, Inc., San Jose, CA (US)

(72) Inventors: Mark J. Conner, Henderson, NV (US); Michael P. Reiman, Santa Cruz, CA (US); Brian M. Quigley, Sunnyvale, CA (US)

(73) Assignee: Edgewater Networks, Inc., San Jose, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/075,047

(22) Filed: Oct. 20, 2020

(65) Prior Publication Data

US 2021/0036911 A1  Feb. 4, 2021

Related U.S. Application Data

(63) Continuation of application No. 15/980,246, filed on May 15, 2018, now Pat. No. 10,819,565.
(Continued)

(51) Int. Cl.
*H04L 41/0654* (2022.01)
*H04L 43/16* (2022.01)
*H04M 7/00* (2006.01)

(52) U.S. Cl.
CPC ......... *H04L 41/0672* (2013.01); *H04L 43/16* (2013.01); *H04M 7/006* (2013.01); *H04L 41/0654* (2013.01)

(58) Field of Classification Search
CPC .............. H04M 7/006; H04L 41/0654; H04L 41/0672; H04L 43/10; H04L 43/16
(Continued)

(56) References Cited

U.S. PATENT DOCUMENTS 10,075,588 B2 * 9/2018 Chandrasekaran . H04M 3/4228
2008/0008165 A1   1/2008 Ikeda et al.
(Continued)

FOREIGN PATENT DOCUMENTS

EP   2312783 A1 * 4/2011 ............. H04L 1/004
JP   2005124057 A * 5/2005

*Primary Examiner* — Rownak Islam
(74) *Attorney, Agent, or Firm* — Brooks, Cameron & Huebsch, PLLC

(57) ABSTRACT

Devices, methods, systems, and computer-readable media for using network connection health data, from multiple sources, to determine whether to switch a network connection on redundant IP networks using VoIP protocol are described herein. One non-transitory computer readable medium includes instructions for connecting an end device used by a first party to communicate with a second party through a VoIP network connection via a VoIP network device, connecting a first network device operating a first network to the VoIP device, connecting a second network device operating a second network to the VoIP device, if there are indications of a fault on at least two OSI layers, then switching from communicating VoIP connection related packets of data on the first network to communicating the VoIP connection related packets of data on the second network.

19 Claims, 7 Drawing Sheets

Related U.S. Application Data

(60) Provisional application No. 62/625,337, filed on Feb. 1, 2018.

(58) Field of Classification Search
USPC .......................... 379/216, 217; 370/216, 217
See application file for complete search history.

(56) References Cited

U.S. PATENT DOCUMENTS

| | | |
|---|---|---|
| 2010/0128616 A1 | 5/2010 | Kitaji |
| 2010/0254307 A1 | 10/2010 | Yokota |
| 2012/0020202 A1 | 1/2012 | Liu et al. |
| 2016/0330667 A1 | 11/2016 | Surmay et al. |
| 2017/0264539 A1* | 9/2017 | Phelan .................... H04L 45/70 |
| 2018/0069878 A1* | 3/2018 | Martini ................. G06F 21/567 |
| 2019/0150150 A1 | 5/2019 | Calin et al. |

* cited by examiner

USING NETWORK CONNECTION HEALTH DATA, TAKEN FROM MULTIPLE SOURCES, TO DETERMINE WHETHER TO SWITCH A NETWORK CONNECTION ON REDUNDANT IP NETWORKS

PRIORITY INFORMATION

This application is a Continuation of U.S. application Ser. No. 15/980,246, filed May 15, 2018, which claims the benefit of provisional application No. 62/625,337, filed Feb. 1, 2018, the contents of which are incorporated herein by reference.

TECHNICAL FIELD

The present disclosure relates to methods, devices, systems, and computer-readable media for using network connection health data, taken from multiple sources, to determine whether to switch a network connection on redundant IP networks.

BACKGROUND

Many organizations use a Voice over Internet Protocol (VoIP) communication system to communicate rather than a traditional telephone communication system. As with all communication systems, the ability to connect the parties wanting to speak to each other over a VoIP system and to maintain that connection, during their intended communication period, is important.

Some keys to maintaining the connection are noticing that an active connection is bad or failing, timing a switch to an alternative pathway for the communication, and making a smooth transition of the communication between the parties from the currently active network connection to a redundant network connection to minimize disruption of the exchange between the parties. With these keys in mind, providers of VoIP services have developed mechanisms and processes to assist network connection problem detection and transition.

As indicated above, some systems utilize redundant network connection(s) that can be switched to, if an active network connection is having difficulty maintaining the connection or the quality of the connection which is affecting the parties' ability to communicate with each other.

In some such systems, the active and redundant network connections (communication links) can be used by a VoIP device, for example, having two or more public wide area network (WAN) data links, one for an active connection and one or more for redundancy, in case the active network connection becomes unreliable or inaccessible. One method for detecting network connection problems is to use Internet Control Message Protocol (ICMP) to ping one or more public remote servers or gateways (i.e., outside of the local VoIP environment that is connecting a call to one party of a multiple party VoIP connection) across the network (e.g., WAN) link (active or redundant) to detect problems on the link.

This testing can, for example, identify if data is being transmitted correctly, if packets are being delayed or lost, and other details that may be helpful with respect to whether a network connection for communication between parties will be successful.

However, many public services drop ICMP pings or severely limit the rate ICMPs responses are sent to the requestor. Although the method may be suitable for slower detection situations, it usually is unsuitable for faster detection which is often needed in the VoIP field as call connections cannot have long periods of interruption or a party to the call will hang up.

Additionally, using a remote server to receive pings makes the testing of the network connections reliant on the remote server that is outside of the control of the local VoIP environment. Accordingly, issues can arise with the network connection to the remote server or to the remote server itself that may not be known to the local VoIP device.

For example, in some situations, the server being pinged through the WAN may go down and when a ping response is not received from that server, the VoIP device that sent the ping may assume the network connection is not working and cause an unnecessary switch to the redundant network connection.

In some instances, attackers use pings to attempt to create a denial of service (DoS) condition within the system. Accordingly, some systems monitor the amount of ping messages received to determine whether the system is being attacked. If the VoIP device is sending pings to the server too frequently, the server being pinged may misinterpret the pings as an attack and begin to refuse incoming pings from the address of the VoIP device. If this happens, such an action may be interpreted by the VoIP device as a bad network connection and cause an unnecessary switch to the redundant network connection.

When the only network connection checking mechanism is ICMP (Network Layer (3)), no other higher layer protocols are being tested or monitored. Accordingly, a network connection may be sending and receiving ICMP pings, but may be having issues on other, higher layer protocols.

Also, since pings are used for a different purpose than communicating between parties, the ICMP messaging only gives an indirect indication of the health of the network connection.

Another more conventional way would be to send data to an external server and monitor the health of the connection on both ends.

This requires setting up or accessing an external server that can handle data from the device needing to test. If this concept is used for a provider of VoIP devices, it is likely that such a server would be used to test all such devices. This would be an expensive proposition, since the data bandwidth/server power needed would grow with each device sold by device provider. Also, the system holding the remote server would need to have extremely high availability, using multiple physical locations, multiple physical servers, each with redundant data connections, and UPS power.

There are two common classification types for major faults that may be present on the connection between the networks. These types of faults are: layer 1 faults indicating that the device is down (e.g., a fault in which the physical device cannot electrically connect to the next device in the network connection (e.g., a node). Layer 1 faults can be due to many reasons, including a data interface that has been administratively set to be unusable or the interface is unplugged from the next hop network device), and layer 2 or higher faults (e.g., IP/TCP/UDP/RTP/SIP/H.323/MGCP, etc.). Layer 1 faults are normally determinate faults, in other words, a device can almost always determine a layer 1 fault. Layer 2 and higher faults are normally indeterminate faults, which a device may or may not be readily able to detect.

The methods above describe independent methods to detect network connection health, but neither give a good indication of the network connection's health. There are many drawbacks to these and other independent methods that can include economic cost, accuracy, precision, and detection speed.

DETAILED DESCRIPTION

Figure 1:
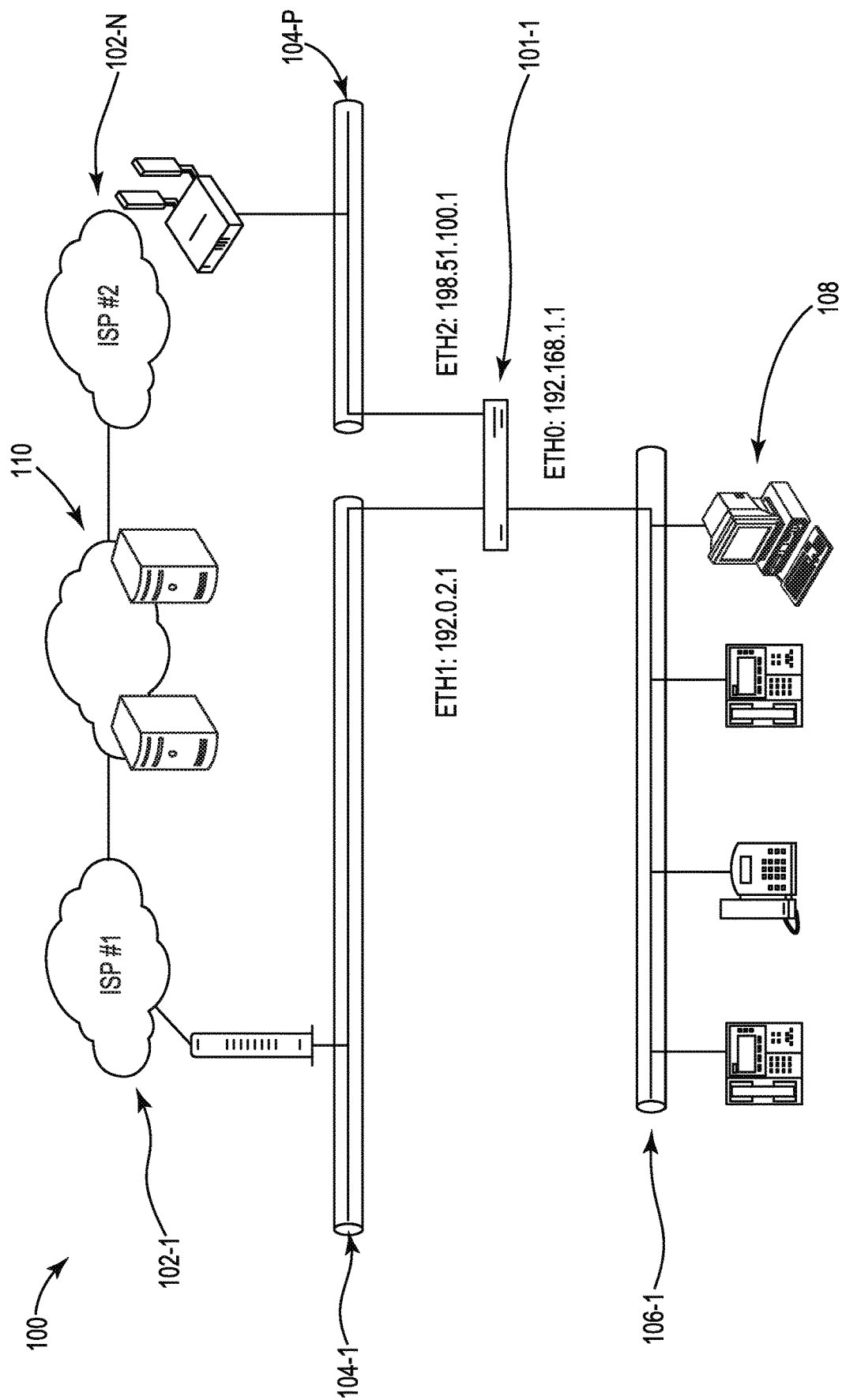
FIG. 1 illustrates an example of a system for use in determining the health of network connections to a VoIP device according to one or more embodiments of the present disclosure.
Figure 2:
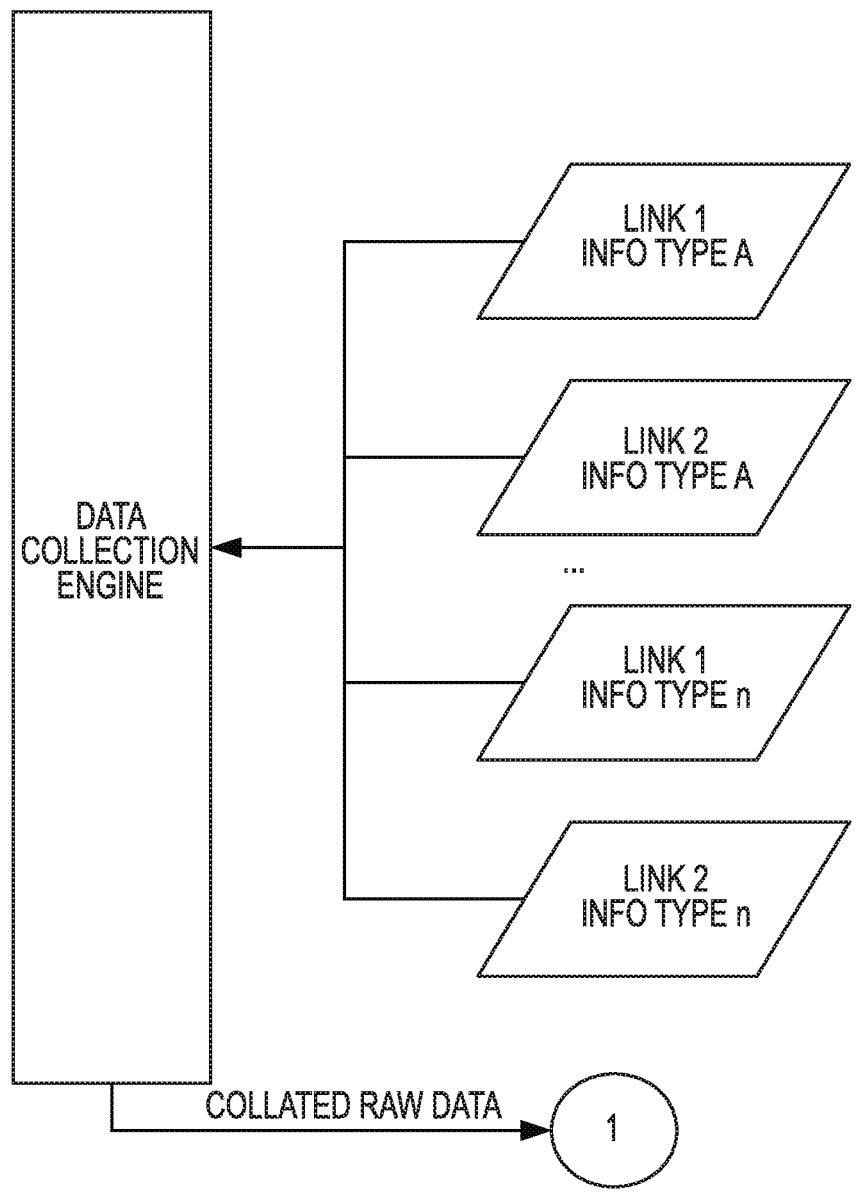
FIGS. 2-7 illustrate a decision tree chart that provides an example of how the functionalities of the system can be accomplished according to one or more embodiments of the present disclosure.
Figure 3:
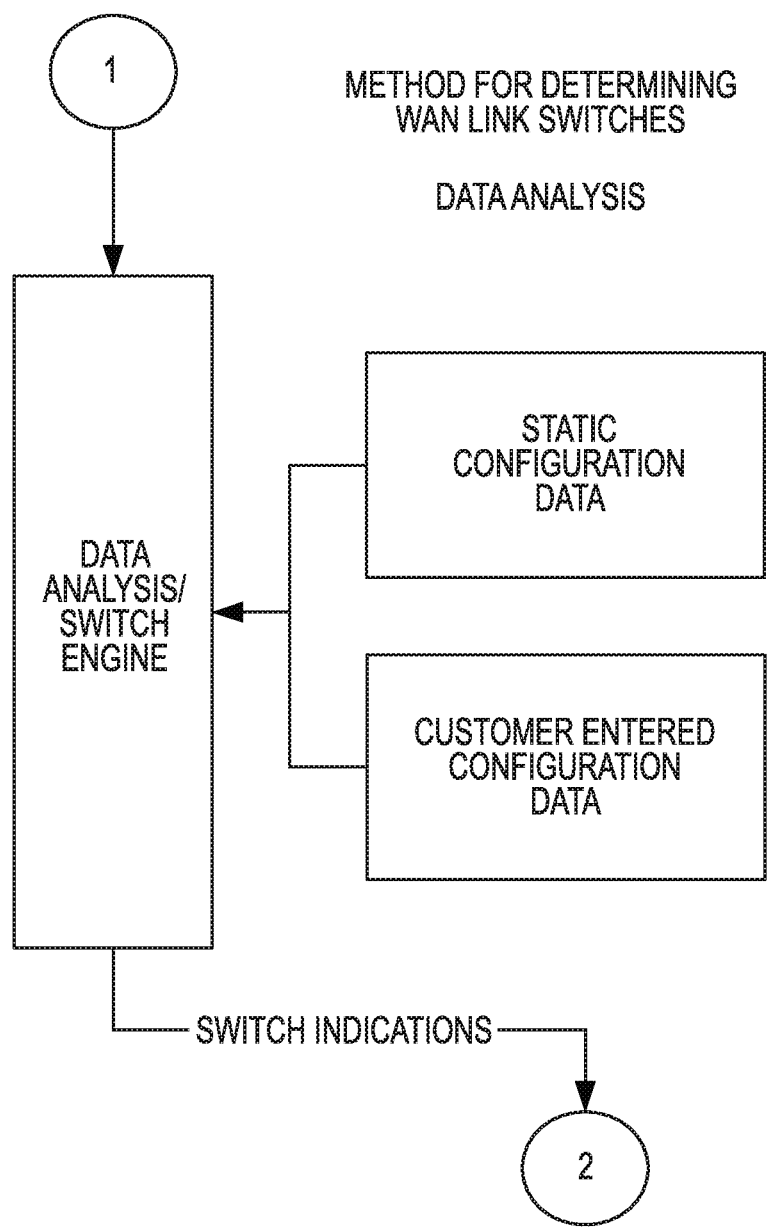

On a normal active data link, getting precise network health, while having minimal effect on the network connection, is a complicated endeavor. The best approach to this would be to modify lower layer (layer(s) 2/3) stacks to present real-time statistics on each active connection. On connectionless data, each higher layer process involved would need to be modified to give statistics on each data stream, if it is even collecting them.

Embodiments of the present disclosure present a methodology that uses indeterminate sources of data/statistics to make an educated decision about the current health of the network connection. Though in some implementations it is not quite as precise as the above-mentioned method, it can be much less intrusive on the active network.

The embodiments of the present disclosure attempt to assist an IP network device, by establishing a communication between parties through a diagnosis of network connection problems. In some embodiments, the multiple sources can be taking place at different layers of the OSI model. Information from these sources can be provided to software and data (e.g., stored in memory on the IP network device and executed by a processor thereon) that acts as a decision collection engine (DCE) which receives the information from multiple sources and evaluates whether the status of one of the networks warrants a switch to a new network (e.g., due to inoperability of the network or degraded network performance).

The embodiments of the present disclosure allow the (Data Analysis/Switch Engine) DA/SE to take input: from the DCE, preset rules (e.g., hard coded and/or manufacturer defined rules), and/or from end user configured rules, to determine error thresholds for each data source, how each data source should be combined with other data sources, and what constitutes declaring that a network connection is below an acceptable level.

Embodiments of the present disclosure also provide that sources for all network connections can be monitored at the same time and can be used to determine network connection health of all network connections. When a network connection is not carrying active traffic, not all sources available, when the network connection is active, may be reporting data, but network connection health can still be determined using all available data sources.

Embodiments of the present disclosure provide that the output from the DA/SE can be used to determine if a switch of physical data network connections is required. The output can be used by multiple sources, for example, including system routing tables and application layer processes that need to perform switch services controlled by the processes. An example of an application layer process would be Session Initiation Protocol (SIP for VoIP). If a new network connection is selected, the SIP application would need to renegotiate the media paths from the previous network connection to the new network connection. This is needed because end user equipment on both sides of the network connections needs to know to use the new network connection.

Embodiments of the present disclosure can use data sources from layers 2-7 of the OSI stack, in some implementations. For example, layer 2 packet counts, layer 3 ping requests, layer 4 UDP loop results, layer(s) 5/6 RTP statistics, layer 7 SIP statistics. One or more of these data sources can be mixed using hard coded rules and/or end-user configuration.

The embodiments of the present disclosure use indeterminate data sources. Indeterminate sources will indicate some problem, but not necessarily a network connection problem. One goal with the indeterminate sources is to combine them together to gather enough evidence, with a high degree of certainty, that the network connection is, in fact, the problem. Examples of some of the possible sources following in the next four paragraphs.

An indeterminate layer 2 source can be a raw packet receive monitor. Normal network activity almost always creates two-way packet communication. For example, TCP always creates two-way packet transmission. This mechanism would monitor if packets are being transmitted on the network connection because at least some packets should be coming back on the network connection.

If a User Datagram Protocol (UDP) loop process is running on the network connections, then two-way packet transmission is guaranteed, unless the network connection is not working properly. The two quantity of packet values (counts of receive and transmit packets) will most of the time not match, but they can be analyzed to see if any packets are being received during a number of samples of packet counts taken during a sampling time period.

If the device is constantly sending packets, but no packets are ever received, then the network connection could be having problems. In this manner, one type of fault indication that can be present on the OSI transport layer is that results from a data source indicate that a threshold quantity of packets are lost or late. Such thresholds can, for example, be set by a user, system administrator, or the manufacturer. One or both of the determinations that a threshold quantity of packets are lost or late can, for example, be based on results from a UDP loop.

As discussed above, UDP is one suitable type of protocol that can be used in embodiments of the present disclosure. It can be beneficial as the packet data can be small (e.g., 19 bytes—with data such as: direction the packet is going, what sequence number in time it is, time stamp relative to the device that is sending the packet, and pseudo random bit error bits). This information can be processed quickly.

UDP is a connectionless protocol that allows a packet to be sent out and there is no indication given to a lower level stack that the packet was ultimately received by another device. By using UDP packets in virtual loops, packets can be sent more frequently than ICMP pings (e.g., in some systems, pings can be sent every three seconds while UDP packets can be sent up to the limit that the sending device can generate and/or the receiving device can process, if desired), but the flood of UDP packets won't risk triggering a Denial of Service (DoS) block from the receiving server routing the packet from the first network connection to the second network connection since it is not going to any external server.

If VoIP is present on the device, then several additional (e.g., layers 5-7) indeterminate data sources can be derived by the statistics generated by the VoIP subsystem. These could include SIP server unreachability (SIP Only), H.323 Gatekeeper unreachability (H.323 only), Call Control Agent unreachability (MGCP only), Real Time Protocol (RTP) loss/errors, Secure Real Time Protocol (SRTP) loss/errors, and low Mean Opinion Score (MOS) ratings.

In some embodiments, the status of the available networks can each be quantified with a numerical value. This information can be used, for example, by instructions that can identify whether the status value of a particular network (an active network or an inactive network) is beyond (above or below) a threshold value.

In some implementations, instructions could be executed to identify whether the status value of a first network is greater than the status value of the second network. This could be used, for example, in instances where the comparison is made between an active network and an inactive network or between two inactive networks. Such an analysis could be used to switch (by executing instructions) from communicating VoIP connection related packets of data on the first network to the second network when the status value of the first network is greater than the status value of the second network.

With regard to threshold type implementations, in one example, instructions could be executed to identify whether an active network connection's status value has fallen below an active network threshold value. In such an implementation, this information can be used to determine whether there is an acceptable inactive network with a status value above an inactive network connection threshold.

In some embodiments, the DCE can utilize one or more weights that can be assigned to certain sources so that their indication is more influential in determining whether a fault requiring switching is present. Multiple networks can be monitored together, in some implementations, and the indications or other received information can be compared to determine which network has the best status or arrange them by most favorable.

For example, each source could have a weighting score (e.g., a numerical value) indicating the current performance for each data source. The scores for each source could be added to come up with an aggregate score for each network connection. The DA/SE portion can analyze these values and determine if a network connection needs to be switched. If there are more than one redundant network connections, the one with the best score could be selected. Other criteria could be added including cost data of each network connection that could be used to help determine which network connection to run on.

An example of how this selection process could be accomplished could be the following. The example system has 3 WAN network connections (i.e., link from a device to a network), consisting of Link 0 (currently active), Link 1, and Link 2. There are 7 indeterminate sources for the active link and 3 sources for each of the inactive links.

The scoring for each source is from 1 to 10. At the start time, all links have the maximum score for each Link 0=70, Links 1,2=30. When normalized, the score for each is 100%, that is the best score link 0 is capable of is 70 and for links 1 and 2 is 30.

The configuration for analyzing when to switch links, located at the DCE, has set a normalized score to switch from the active link of 70% to switch if the active is at or below that threshold, and 75% for an inactive link to be able to accept traffic if a switch is needed. Such settings can be set by the manufacturer and/or user, for example.

After a certain period, Link 0's score falls to 64.8% (a score of 45 out of a maximum of 70), while Link 1's score is 93.3% (28/30), and Link 2's score is 100% (30/30), so a switch is called for. Without using any extra data, a switch to Link 2 could be called.

If cost analysis is applied, where 1 is the lowest and 10 is the highest, and Link 0's cost value is determined to be 1, Link 1's cost is 3, and Link 2's cost is 10, then a switch to Link 1 would be called. This is because Link 1's cost is much lower, and its score is still acceptable.

Examples of costs can, for example, be monetary, differences in performance, bandwidth, maximum usage, latency, slower network connection, incentives from a network connection provider, and/or other differentiating factors that can be used for weighting the network connections comparable to each other. Additionally, in some embodiments, costs can be weighted in comparison to each other based, for example, on cost factors that are more important to the user. An additional use for the scoring data would be for customer presentation and for historic Operational Measurements (OMs).

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of operations" can refer to one or more operations.

The present disclosure also uses the letters M, N, and P to along with the numbers in the figures to illustrate that those items can have any number of such items above the number previously used to describe that item. For example, 101-1 and 101-M are used which means that M can represent any number larger than 1. Accordingly, M could represent the $2^{nd}$ such item, the $5^{th}$ such item, the $1000^{th}$ such item, etc.

FIG. 1 illustrates an example of a system for use in determining the health of network connections to a IP network device according to one or more embodiments of the present disclosure. In the embodiment illustrated in FIG. 1, the system 100 includes a number of IP network devices 101-1, a number of networks 102-1 and 102-N (WAN networks), a number of network connections 104-1 and 104-P, a local network 106-1 (there could be any number of these), a number of end communication devices that a party may use to communicate with another party over the IP network connection, and a number of intermediary service devices (e.g., one or more routing devices) 110 that allow provide a pathway to allow the passing of packets between networks 102-1 and 102-N.

As can be seen from the illustration in FIG. 1, an IP network computing device 101-1 is connected to network connections to several networks. For instance, network connection 104-1 allows connection to network 102-1 (e.g., Internet Service Provider (ISP) #1) and a unique IP address is provided to identify the device 101-1 with respect to that network. Network connection 104-P allows connection to network 102-N (ISP #2) and a unique IP address (different from that used for network 102-1) is provided to identify the IP network device 101-1 with respect to that network. Additionally, IP network device 101-1 is also connected to a local network (LAN) through network connection 106-1 and a unique IP address (different from those used for networks 102-1 and 102-N) is provided to identify the IP network device 101-1 with respect to that network.

These unique IP addresses can be used to indicate where the connectionless packets are to be directed. For example, if the IP network device is referred to as 198.51.100.1 for the network 102-N, then when sending through network 102-1, the packet can be directed toward that address.

The analysis of this testing data (e.g., the DCE) can be accomplished on the IP network device (e.g., VoIP device) 101-1 or elsewhere on the system 100. To accomplish this analysis, the analyzing device (e.g., 101-1) can include a processor and a memory. The memory can have various types of information including data and executable instructions that can be executed by the processor to accomplish the construction of packets, the sending of the packets, receiving the packets, extracting its contents, and analyzing its contents, as discussed herein.

The processor can execute instructions that are stored in memory, for example, on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory and/or the processor may be located on the IP network device 101-1 or off of the computing device, in some embodiments. As such, as illustrated in the embodiment of FIG. 1, the IP network device 101-1 can include a network interface having input and/or output capabilities. Such an interface can allow for processing on another networked computing device and/or can be used to obtain data and/or executable instructions for use with various embodiments provided herein.

As illustrated in the embodiment of FIG. 1, the IP network device 101-1 can be connected to a user interface (e.g., computing device shown at 108) that allows a user to review instructions and/or data on the device. Such an interface can be used to review data packets, check the analysis of the data, change the parameters of the test (direction of travel of the packets, type of information sent, timing of packets, networks to be traversed by the packets, etc.), or change the frequency of the tests, among other functions. The user interface can allows the user to select the multiple sources to determine whether an active and/or one or more inactive networks is inoperable or degraded. The user can also use the interface to select which network from multiple networks the user would like to use going forward or for a particular time period.

Provided below are descriptions of several embodiments that can be utilized according to embodiments of the present disclosure. For example, a non-transitory computer readable medium can have instructions thereon that are executable by a processor for using network connection health data, taken from multiple sources, to determine whether to switch a network connection on redundant IP networks using VoIP protocol.

In this example embodiment, the instructions include connecting an end device used by a first party to communicate with a second party through a VoIP network connection via a VoIP network device, connecting a first network device operating a first network to the VoIP device, and connecting a second network device operating a second network to the VoIP device. For instance, the first party can be a person attempting to make a VoIP call to a second party.

The instructions in this example also include reviewing data from at least two indeterminate sources to determine an inoperable or degraded condition status for the first network, the at least two sources selected from the group of sources including, an indication that there is an OSI data link layer fault on the first network, an indication that there is an OSI network layer fault on the first network, an indication that there is an OSI transport layer fault on the first network, an indication that there is an OSI session layer fault on the first network, an indication that there is an OSI presentation layer fault on the first network, and an indication that there is an OSI application layer fault on the first network. If there are at least two indications of a fault on the same or different layers, then a switch is initiated from communicating VoIP connection related packets of data on the first network to communicating the VoIP connection related packets of data on the second network.

Such switching can occur based on a number of factors. For example, instructions can be executed to review data from at least two sources to determine an inoperable or degraded condition status for the second network, the at least two sources selected from the group of sources including, an indication that there is an OSI data link layer fault on the second network, an indication that there is an OSI network layer fault on the second network, an indication that there is an OSI transport layer fault on the second network, an indication that there is an OSI session layer fault on the second network, an indication that there is an OSI presentation layer fault on the second network, and an indication that there is an OSI application layer fault on the second network. If the status of the first network is inoperable or degraded and the status of the second network is not inoperable or not degraded, then executing instructions to switch from communicating VoIP connection related packets of data on the first network to the second network when the selected sources indicate the first network is inoperable or degraded.

In another example embodiment, a system for using network connection health data, taken from multiple sources, to determine whether to switch a network connection on redundant IP networks using VoIP protocol includes a VoIP device that is connected to an end device used by a first party to communicate with a second party through a VoIP network connection via the VoIP device, a first network device operating a first network connected to the VoIP device, and a second network device operating a second network connected to the VoIP device. The system has executable instructions stored in memory that execute to review data from multiple sources to determine whether the first network is inoperable or degraded.

There can be a variety of indicators from these sources of data that can be used for such a determination. For example, suitable indicators include a raw packet count is below a threshold quantity, ICMP ping requests are being lost, User Datagram Protocol loop results indicate a threshold quantity of packets are lost, User Datagram Protocol loop results indicate a threshold quantity of packets are late, RTP/SRTP packet lost when using a VoIP protocol, a Session Initiation Protocol server is unreachable, an H.323 gatekeeper is unreachable, a call controller is unreachable, and/or a Mean Opinion Score (MOS) is below a certain threshold. In such an embodiment, executable instructions stored in memory can be executed to switch from communicating VoIP connection related packets of data on the first network to the second network when a predetermined plurality of the sources indicate the first network is inoperable or degraded.

In such embodiments, one or more additional networks can be evaluated to determine whether each network is inoperable or degraded. There can be a variety of indicators from these sources of data that can be used for such a determination. For example, suitable indicators include a raw packet count is below a threshold quantity, ICMP ping requests are being lost, results indicate a threshold quantity of packets are lost, results indicate a threshold quantity of packets are late, a Session Initiation Protocol server is unreachable, an H.323 gatekeeper is unreachable, and a call controller (MGCP) is unreachable.

For instance, executable instructions stored in memory can be executed to switch from communicating VoIP connection related packets of data on the first network to the second network when the selected sources indicate the first network is inoperable or degraded. In this manner the system can determine whether a first network or second network is most suitable for communicating the VoIP connection related packets based on the reviewed data from the multiple selected sources. As can be understood by the reader, this process can be used to determine which network should be the active network and which network should be a redundant network and to communicate the VoIP connection related packets on the active network.

In some implementations, the determination, in situations when the first and second networks are operable or degraded, but not inoperable, of which network should be the active network and which one or more networks should be the redundant network(s) can be accomplished in the various manners described herein. For example, instructions can be executed to compare a characteristic of each of the selected multiple sources of the first network against each corresponding characteristic of the selected multiple sources of the second network.

For instance, a characteristic of the selected multiple sources of the first network can be a quantity of late packets from a User Datagram Protocol loop process on the first network. It can be compared to a corresponding characteristic of the selected multiple sources of the second network, for example, a quantity of late packets from a User Datagram Protocol loop process on the second network.

In some embodiments, another way in which a switch indication can be determined is by a Real-time Transport Protocol data loss on active calls that is over a threshold quantity. Further, another switch indication mechanism can be by a Mean Opinion Score (MOS) that is below a threshold value.

In a third example embodiment, a VoIP device for using network connection health data, taken from multiple sources, to determine whether to switch a network connection on redundant IP networks using VoIP protocol includes a connection to an end device used by a first party to communicate with a second party through a VoIP network connection via the VoIP device, a connection to a first network device operating a first network connected to the VoIP device, and a connection to a second network device operating a second network connected to the VoIP device.

This device includes executable instructions stored in memory that execute to review data from multiple sources to determine whether the first network is inoperable or degraded.

The determination, in this example can be made from data including that a raw packet count is below a threshold quantity, ICMP ping requests are being lost, User Datagram Protocol loop results indicate a threshold quantity of packets are lost, User Datagram Protocol loop results indicate a threshold quantity of packets are late, RTP/SRTP packet lost when using a VoIP protocol, a Session Initiation Protocol server is unreachable, an H.323 gatekeeper is unreachable, a MGCP call controller is unreachable, and Mean Opinion Score (MOS) is below a certain threshold. As discussed with other embodiments herein, this information can be used to switch from communicating VoIP connection related packets of data on the first network to the second network when a predetermined plurality of the sources indicate the first network is inoperable or degraded.

FIGS. 2-7 illustrate a decision tree chart that provides an example of how the functionalities of the system can be accomplished according to one or more embodiments of the present disclosure. In this example, the DCE on the left side of the chart collects the indication of fault information for two network connections (i.e., link 1 and link 2, though as discussed herein, there could be many network connections from multiple sources (designated by info network connection type A-n). The DCE decides which data sources to listen to, and at what time increment to collect the data from each source. The data is then collated and sent (Circle #1) to the DA/SE to be analyzed. These tasks could be all handled by one application on a single computer, multiple tasks on a single computer or by separate tasks on multiple computers.

In some embodiments, the data analysis/switch engine receives static configuration data and/or customer entered configuration data. The static configuration data can be programmed, for example, by the manufacturer of the IP network device. The information provided are items like what types of indications should be valued with respect to determining (e.g., layer 1, layer 2, but not layer 3; physical layer, network layer, but not transport layer; assign a hierarchy of indications or weighted value assignments). The customer entered configuration data can be provided by any user of the system (e.g., network administrator, first party to the communication that is being established).

In the DA/SE, current data from the DCE, historical data from the DCE, is analyzed using the static (hard coded or manufacturer defined) and dynamic user (user changeable) rule configuration.

Figure 4:
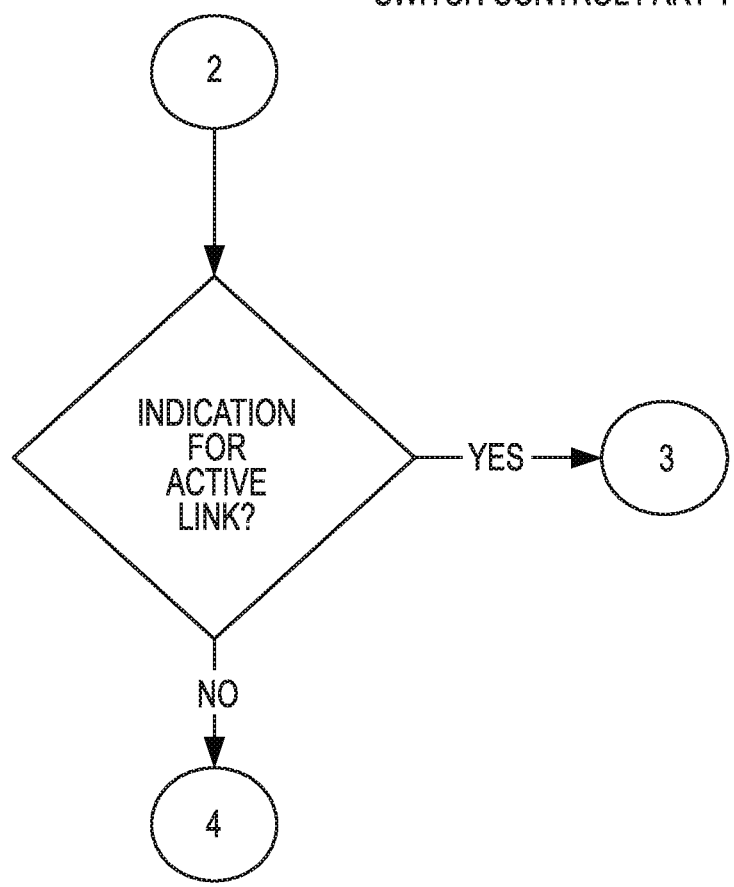

Once the analysis has been completed and if a determination as to whether a switch of networks should occur, one or more switch indications is sent from the data analysis/switch engine toward Circle #2 which feeds it into a switch controller in FIG. 4. As shown the switch controller can look at the condition of the active network connection by assessing whether the switch indication received from the data analysis/switch engine is for the active network connection (current network).

Figure 5:
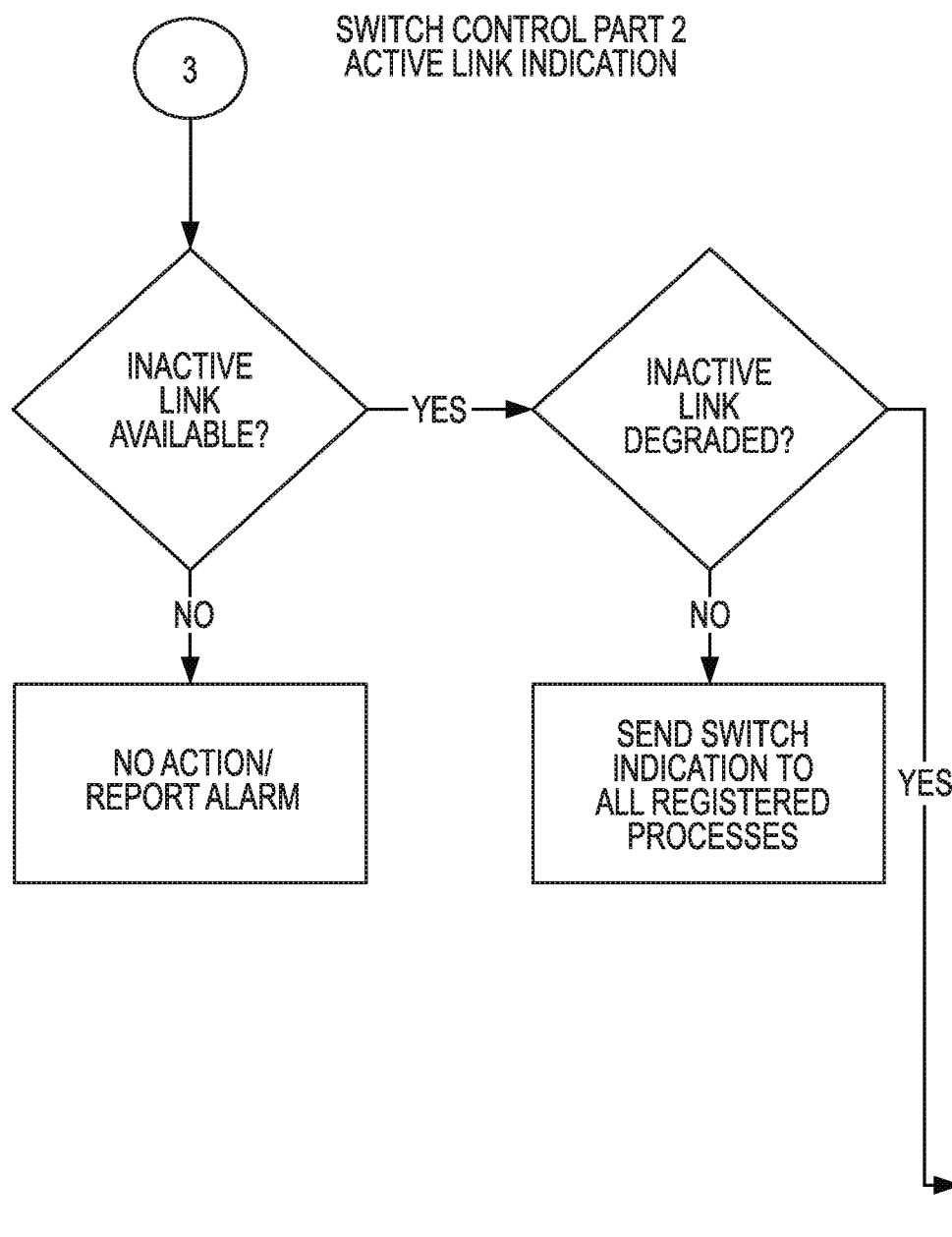

If the indication is for the active network connection, then the decision tree moves to FIG. 5. This path indicates that the active network connection needs to be switched. In response to this indication, the switch from current to backup can be made.

However, in the embodiment of FIGS. 2-7, the availability of the inactive network connection (backup network) is checked to make sure that the switch does not take the connection from a bad one to a worse one. In FIG. 5, the inactive network connection is checked and if it is unavailable (inoperable or degraded below a threshold level) at which point the switch controller trips an alarm to let the user/administrator know that the backup is not available, and its status needs to be reset so that it is available when needed.

If the inactive network connection is available, then the system checks to see if the inactive network connection is degraded. If it is not, then the system sends a switch indication to all registered processes, so they can begin migrating to the new active network connection. If the inactive network connection is degraded, the decision tree moves toward Circle #5 which feeds into a switch controller in FIG. 7.

Figure 6:
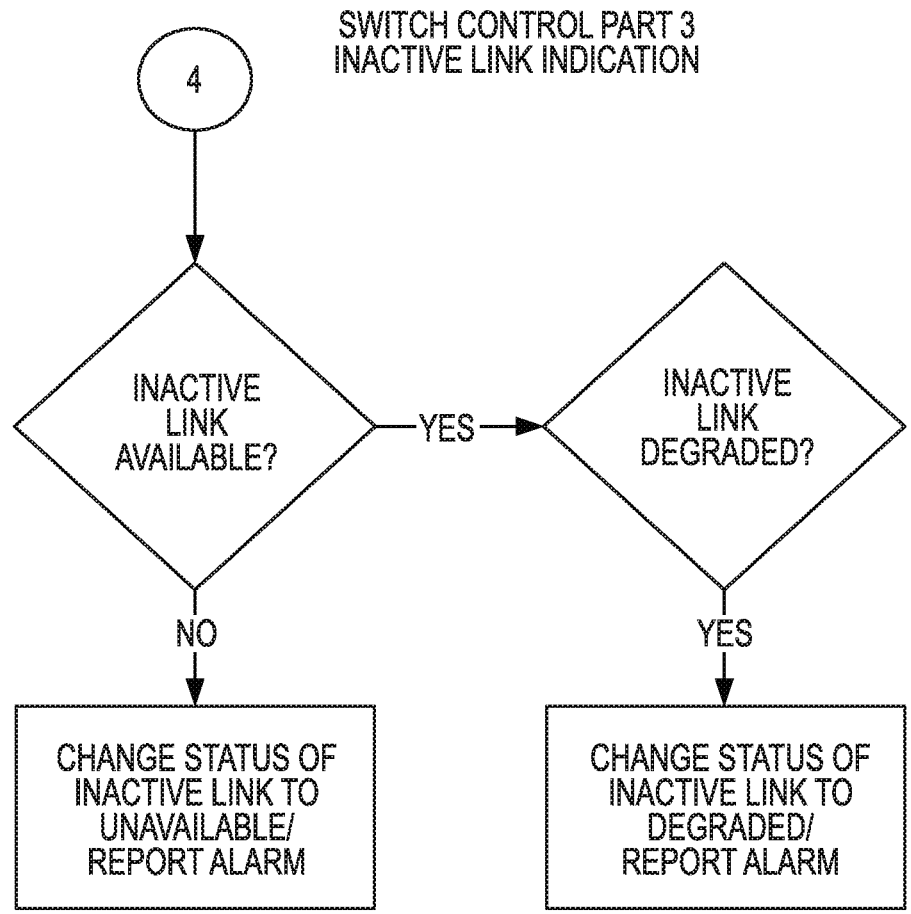

Returning to FIG. 4 regarding the second possible decision regarding the active network connection, if the switch indication is not for the active network connection, then the decision tree moves to FIG. 6. In this Figure, the system still checks the status of the inactive network connection.

If the inactive network connection is available, then the system checks to see if the inactive network connection is degraded. If it is degraded, then the system changes the status (e.g., a flag at a memory location) of the inactive network connection to—degraded and a report and/or alarm is generated. If the inactive network connection is not available, then its status is changed to unavailable and a report and/or alarm is generated.

Figure 7:
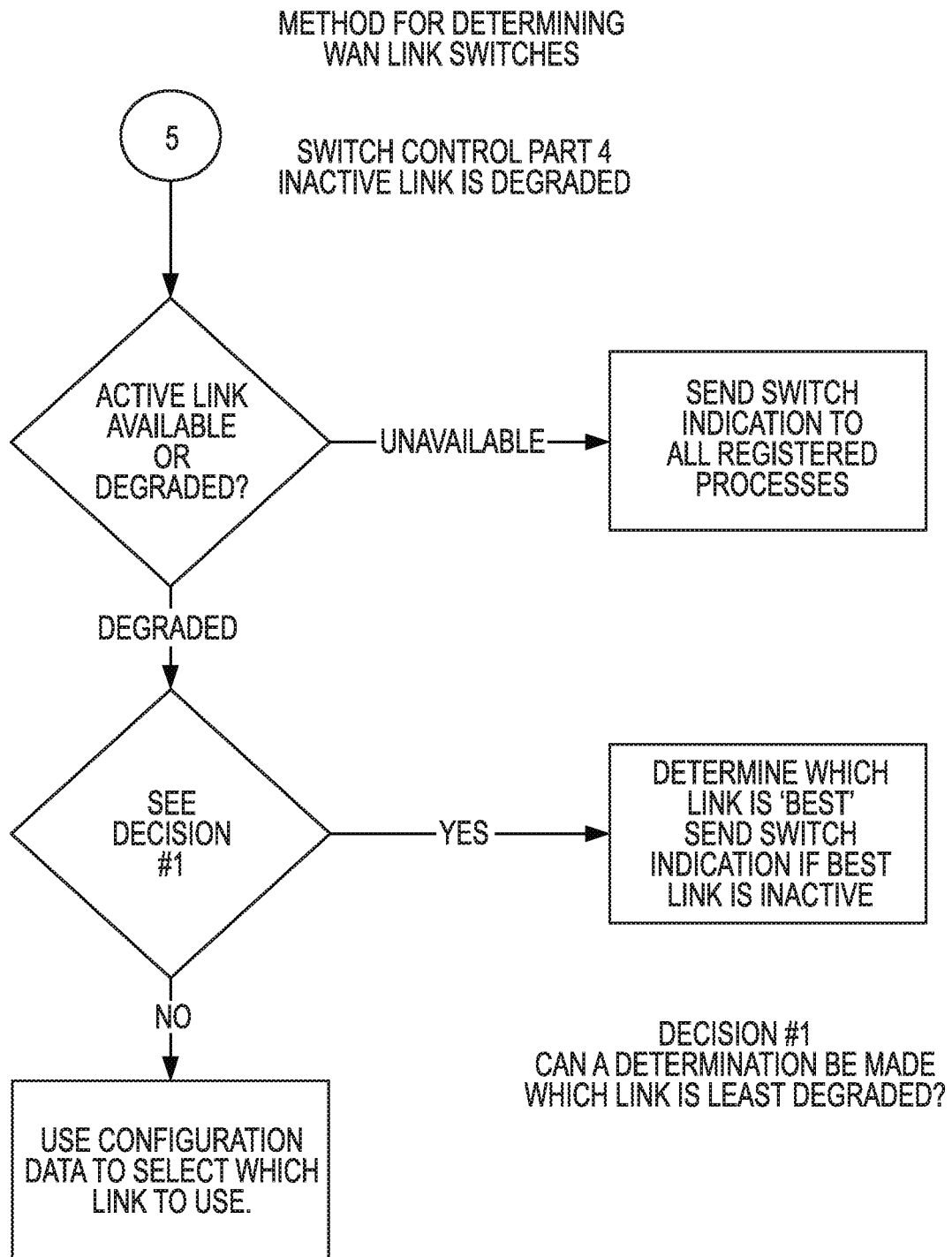

In FIG. 7, the system checks to see whether the active network connection is available or degraded. If unavailable, the system sends switch indications to all registered processes. If the active network connection is degraded (over a threshold value/percentage) then, in some embodiments a determination can be made as to which network connection is least degraded.

A determination can also be made in some embodiments how costly the connection will be. This can be beneficial when one network is much more costly than the other network. In some instances, cost and operability can be evaluated together to determine which network connection is the best under those circumstances.

If the determination of which network connection is the best can't be made, then user configuration data (preferred cost, bandwidth, network type) can be used to select the network connection. In some embodiments, this analysis can be done periodically, so that it does not need to be done.

The embodiments of the present disclosure allow inputs from multiple sources, most of which are indeterminate by themselves with respect to telling whether a fault condition is present use them in combination to determine which network connections are operable and not at the time a communication between a first and second party's is taking place or as a preventative measure that can be done periodically.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A voice over Internet protocol (VoIP) device for determining which network should be an active network, comprising:
   a memory; and
   a processor configured to execute instructions stored in the memory to:
     determine if there are one or more indications of a fault on a first network, wherein the one or more indications of a fault include at least one of: an indication that there is an Open Systems Interconnection (OSI) network layer fault on the first network, an indication that there is an OSI transport layer fault on the first network, an indication that there is an OSI session layer fault on the first network, an indication that there is an OSI presentation layer fault on the first network, or an indication that there is an OSI application layer fault on the first network;
     compare a quantity of late packets on the first network against a quantity of late packets on a second network in response to one or zero indications of the fault on the first network; and
     determine the second network should be the active network based on the comparison.

2. The device of claim 1, wherein the processor is configured to execute instructions stored in the memory to communicate a VoIP connection related packet on the second network in response to determining the second network should be the active network.

3. The device of claim 1, wherein the processor is configured to execute instructions stored in the memory to communicate a VoIP connection related packet on the first network prior to comparing the quantity of late packets on the first network against the quantity of late packets on the second network.

4. The device of claim 1, wherein the processor is configured to execute instructions stored in the memory to connect a first network device operating the first network to the VoIP device.

5. The device of claim 1, wherein the processor is configured to execute instructions stored in the memory to connect a second network device operating the second network to the VoIP device.

6. The device of claim 1, wherein the processor is configured to execute instructions stored in the memory to connect a first end device used by a first party to the VOID network device.

7. The device of claim 1, wherein the processor is configured to execute instructions stored in the memory to connect a second end device used by a second party to the VoIP network device.

8. The device of claim 1, wherein the quantity of late packets on the first network are based on results from a User Datagram Protocol loop on the first network and the quantity of late packets on the second network are based on results from a User Datagram Protocol loop on the second network.

9. A system for determining which network should be an active network, comprising:
   a first network;
   a second network; and
   a voice over Internet protocol (VoIP) device configured to:
      determine if there are one or more indications of a fault on the first network;
      compare a quantity of late packets on the first network against a quantity of late packets on the second network in response to one or zero indications of the fault on the first network; and
      determine whether the first network or the second network should be an active network partially based on comparing the quantity of late packets on the first network against the quantity of late packets on the second network.

10. The system of claim 9, wherein the VoIP device is configured to communicate a first number of VoIP related packets on the first network prior to determining the second network should be the active network and communicate a second number of VoIP related packets on the second network in response to determining the second network should be the active network.

11. The system of claim 9, wherein the one or more indications of a fault include at least one of: an indication that there is an Open Systems Interconnection (OSI) network layer fault on the first network, an indication that there is an OSI transport layer fault on the first network, an indication that there is an OSI session layer fault on the first network, an indication that there is an OSI presentation layer fault on the first network, or an indication that there is an OSI application layer fault on the first network.

12. The system of claim 9, wherein the VoIP device is configured to determine a cost of using the first network as the active network and a cost of using the second network as the active network.

13. The system of claim 12, wherein the VoIP device is configured to compare the cost of using the first network as the active network against the cost of using the second network as the active network.

14. The system of claim 13, wherein the VoIP device is configured to determine whether the first network or the second network should be an active network partially based on comparing the cost of using the first network as the active network against the cost of using the second network as the active network.

15. A non-transitory computer readable medium having instructions thereon that are executable by a processor for determining which network should be an active network, comprising:
   determining when a first network and a second network are operable or degraded;
   comparing a quantity of late packets on the first network against a quantity of late packets on the second network when the first and second networks are operable or degraded; and
   determining which network should be an active network and which network should be a redundant network among the first network and the second network based on the comparison.

16. The medium of claim 15, wherein the executable instructions include switching the second network from the redundant network to the active network in response to the second network being less degraded than the first network.

17. The medium of claim 15, wherein the executable instructions include changing a status of the second network in response to determining the second network is degraded.

18. The medium of claim 17, wherein the executable instructions include generating a report in response to changing the status of the second network.

19. The medium of claim 17, wherein the executable instructions include generating an alarm in response to changing the status of the second network.

* * * * *